(12) United States Patent
Bedi et al.

(10) Patent No.: US 8,866,847 B2
(45) Date of Patent: Oct. 21, 2014

(54) PROVIDING AUGMENTED REALITY INFORMATION

(75) Inventors: Bharat V. Bedi, Portsmouth (GB); Wilfredo Ferre, Le Mesnil le Roi (FR); Anthony Herve, Paris (FR); Marc P. Yvon, Antony (FR)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 13/226,575

(22) Filed: Sep. 7, 2011

(65) Prior Publication Data

US 2012/0062596 A1    Mar. 15, 2012

(30) Foreign Application Priority Data

Sep. 14, 2010   (EP) .................................... 10305981

(51) Int. Cl.
  *G09G 5/00*    (2006.01)
  *G06Q 30/06*   (2012.01)
  *G06Q 30/02*   (2012.01)
(52) U.S. Cl.
  CPC ........ *G06Q 30/0256* (2013.01); *G06Q 30/0643* (2013.01); *G06Q 30/0267* (2013.01); *G06Q 30/0623* (2013.01)
  USPC .......................................................... 345/633
(58) Field of Classification Search
  None
  See application file for complete search history.

(56) References Cited

U.S. PATENT DOCUMENTS 6,300,955 B1 * 10/2001 Zamir ............................ 382/283
7,707,073 B2   4/2010 Bloebaum et al.
7,962,485 B1 * 6/2011 Trandal et al. ................ 707/736
2005/0248681 A1 * 11/2005 Nozaki et al. ................. 348/345
2007/0182829 A1 * 8/2007 Zacks et al. ................ 348/222.1
2009/0285483 A1   11/2009 Guven et al.

FOREIGN PATENT DOCUMENTS

| DE | 19737565 A1 | 3/1999 |
| DE | 19832486 A1 | 1/2000 |
| WO | 03010713 A1 | 6/2003 |
| WO | 2008084689 A1 | 7/2008 |

OTHER PUBLICATIONS

Zhu et al., "Design of the PromoPad: an Automated Augmented Reality Shopping Assistant", 12th Americas Conference on Information Systems, Aug. 4-6, 2006, Acapulco, Mexico, pp. 1-16.
Giuseppe Costanza, "FoodTracer", http://www.giuseppecostanza.it/foodtracer/, Printed Sep. 7, 2011, 1 page.
Application No. GB1222027.3, Combined Search and Examination Report under Sections 17 and 18(3), dated May 15, 2013, 5 pages.

* cited by examiner

*Primary Examiner* — Ryan R Yang
(74) *Attorney, Agent, or Firm* — Andrea Bauer; Hoffman Warnick LLC

(57) ABSTRACT

A system, method and computer program product for providing augmented reality information is disclosed. The method includes capturing an image of a set of items with an image capturing component coupled to a network-enabled computing device associated with a user identifier. The captured image is processed to identify each item of the set of items while a predefined list of user's preferences is retrieved using the user identifier. For each identified item, checking is made if the item matches a condition related to the predefined list of user's preferences. And based on the matching result, item information is conveyed to the network-enabled computing device and overlaid on the image.

17 Claims, 5 Drawing Sheets

PROVIDING AUGMENTED REALITY INFORMATION

FIELD OF THE INVENTION

The present invention relates generally to the field of augmented reality, and more particularly to a system and method for providing augmented reality information to optimize a shopping list.

RELATED ART

Customers have less and less time and energy to spend shopping. Even conscientious customers who create a shopping list to improve their shopping efficiency often forget the list, omit an item from the list, or include an item in the list that is not sold at the store or that is temporarily not available.

Choosing alternate products or finding new equivalent products becomes too time consuming for customers in environments where a large variety of products is offered.

Several solutions to address this issue are based on Augmented Reality (AR) applications whereby the consumer's real-world perception is enhanced by virtual elements to provide additional information.

"FoodTracer" from Giuseppe Costanza is a system consisting of a mobile phone application and desktop software which aims to provide easy access to information about food and review grocery shopping behaviors. The system is designed to be used in supermarkets to enable users to make better informed decisions while they shop. A FoodTracer user points a phone camera at a single product. The application recognizes and analyses the image and then overlays the camera image with product information based on different parameters.

U.S. Pat. No. 7,707,073 discloses a method for providing augmented shopping information to a user of a mobile terminal in a store. The method includes providing a shopping list identifying a plurality of items and obtaining information regarding physical locations of respective ones of the items in the store. The location of the mobile terminal in the store is established. An image of a view from the location is obtained. At least one of the items having an associated location in the obtained image is identified based on the obtained information regarding physical locations. A position within the image corresponding to the respective physical location of the identified at least one of the items is determined. A graphic indication of the identified item is added to the obtained image at the determined position within the image to provide an augmented image of the view. The augmented image of the view is displayed to the user on a display of the mobile terminal. The method requires the physical location of the items to be predefined, stored, and maintained, and makes use of an image.

Whereas the related art offers helpful solutions for providing additional information to consumers in a shop, there is still some limitation in the number of products processed, in the extent of the information provided to the user at a time, and in the requirement of storing products positioning in a shop.

SUMMARY OF THE INVENTION

The present invention helps users make better personal choices, selections, and decisions in environments where the number of options in a view is large, and wherein time for decision is limited. Further, the present invention provides a flexible system for enhancing information on a single view of products disposed in a shop.

The present invention provides a system and a method for providing augmented reality information to a user, a system and method for performing real-time recognition of a plurality of items captured in a single image, and an augmented reality based system and method for enhancing information on a set of products disposed on shelves in a shop.

In accordance with a first aspect, the present invention is directed to a method for providing augmented reality information on a network-enabled computing device associated with a user identifier, the method comprising: capturing an image of a set of items with an image capturing component coupled to the network-enabled computing device; processing the image to identify each item of the set of items; retrieving a predefined list of user preferences for the user using the user identifier; for each identified item, checking if the item matches a condition related to the predefined list of users preferences; based on a result of the matching, conveying item information to the network-enabled computing device; and overlaying the item information on the image.

In another aspect of the present invention, there is provided a system for providing augmented reality information on a network-enabled computing device associated with a user identifier, the system comprising: a system for capturing an image of a set of items with an image capturing component coupled to the network-enabled computing device; a system for processing the image to identify each item of the set of items; a system for retrieving a predefined list of user preferences for the user using the user identifier; a system for checking, for each identified item, if the item matches a condition related to the predefined list of user preferences; a system for conveying item information, based on the result of the matching, to the network-enabled computing device; and a system for overlaying the item information on the image.

In yet another aspect of the present invention, there is provided a computer readable medium having a computer program product stored thereon, which when executed by a computing device, performs a method for providing augmented reality information on a network-enabled computing device associated with a user identifier, the method comprising: capturing an image of a set of items with an image capturing component coupled to the network-enabled computing device; processing the image to identify each item of the set of items; retrieving a predefined list of user preferences for the user using the user identifier; for each identified item, checking if the item matches a condition related to the predefined list of user preferences; based on the result of the matching, conveying item information to the network-enabled computing device; and overlaying the item information on the image.

BRIEF DESCRIPTION OF THE DRAWINGS

Further aspects of the invention will now be described, by way of implementation and examples, with reference to the accompanying figures.

The above and other items, features and advantages of the invention will be better understood by reading the following more particular description of the invention in conjunction with the figures.

DETAILED DESCRIPTION OF THE INVENTION

Figure 1:
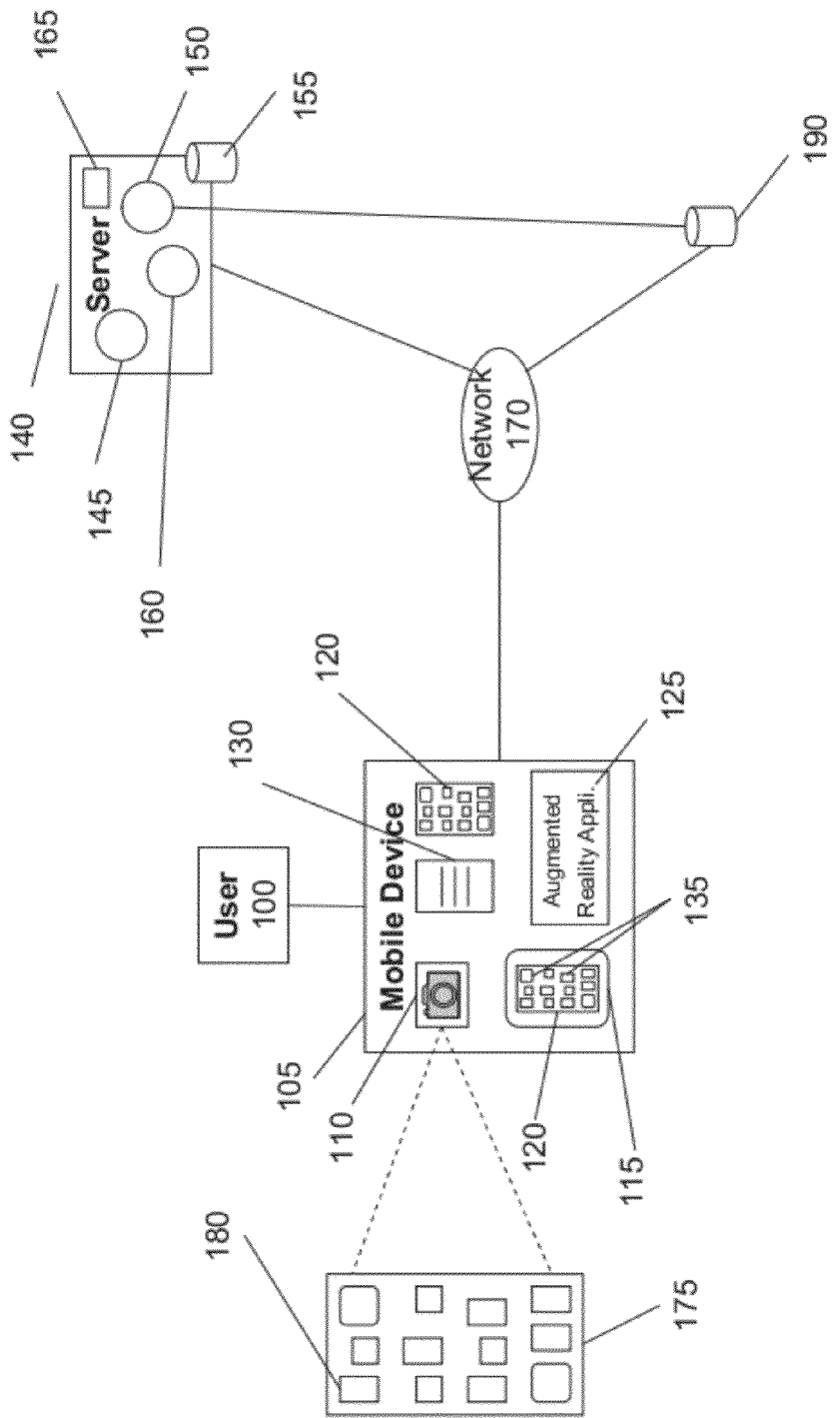
FIG. 1 is a schematic diagram illustrating an environment in which the system of the present invention can be operated in accordance with an embodiment of the present invention.

Embodiments of the invention are described hereinafter by way of examples with reference to the accompanying figures and drawings. Corresponding reference numerals indicate corresponding parts throughout the several views of the drawings.

FIG. 1 is a schematic diagram illustrating an environment in which the system of the present invention can be operated in accordance with an embodiment.

A user 100 operates a mobile device 105 including at least a camera 110, a display screen 115, and an augmented reality application 125.

It is to be understood that the mobile device 105 may include any standard components and functions not shown in FIG. 1. The operating system of the mobile device 105 can be a streamlined or compact operating system designed for resource constrained devices. For example, the mobile device 105 can include one the following known operating systems such as GOS, POCKET LINUX, PALM OS, WINDOWS COMPACT EDITION, and any of a variety of other operating system specifically designed for compact or embedded devices. The mobile device 105 is not limited to use of a compact OS and in another embodiments the mobile device 105 can be an ultra-mobile device, a notebook, or device with sufficient internal resources to host a desktop operating system made for personal computers.

In operation, the user 100 points the camera 110 at a set 175 of products, items, or choices 180. A user interface 130 of the augmented reality application 125 displays the live camera image 120 on the mobile device display screen 115 with the items captured 135.

The live image 120 is captured and transmitted to a server 140 over a network 170 for processing.

The network 170 can include any hardware, software, and/or firmware necessary to convey data encoded within carrier waves. Data can be contained within analog or digital signals and conveyed through data or voice channels. The network 170 can include local components and data pathways necessary for communications to be exchanged among computing device components and between integrated device components and peripheral devices. The network 170 can also include network equipment, such as routers, data lines, hubs, and intermediary servers which together form a data network, such as the Internet. The network 170 can also include circuit-based communication components and mobile communication components, such as telephony switches, modems, cellular communication towers, and the like. The network 170 can include line based and/or wireless communication pathways.

The server 140 includes several components used in combination to process an image received from the mobile device 105 and provide overlay information back to the mobile device 105. The components include an Image Processing Service 145, an Item Matching Service 150, an Item Information Repository 155 and a Single Object Recognition Service 160. These components are used to process the received image 120 and generate a Matching Item List 165 containing the details of the objects and items of interest within the given image 120.

The Image Processing Service 145 splits the image received into individual images each containing the image data or pixels for an individual item within the original image 120.

The Single Object Recognition Service 160 takes each individual image and identifies the item in the image. This latter operation is done by utilizing the information held within the Item Information Repository 155.

The Item Matching Service 150 takes each of the items identified by the Single Object Recognition Service 160 and uses the Item Information Repository 155 to looks up the properties and characteristics for each item. The Item Matching Service 150 further compares each of the items against the user preferences held in a User Preference Store 190. Matching items are later added to the Matching Items List 165.

The User Preference Store 190 may be a local or a remote repository. The information can be stored within User Preference store 190 in a variety of manners. For example, information can be stored within a database structure or can be stored within one or more files of a file storage system, where each file may or may not be indexed for information searching purposes. Further, User Preference store 190 can utilize one or more encryption mechanisms to protect stored information from unauthorized access. The user's preferences are retrieved using a user's identification either received with the image transmitted or by the user's mobile device connection (e.g., a user's mobile device identifier).

The Item Information Repository 155 stores information about each item including its properties. These properties for example could be the fat content, calorific value, and allergy information in the case of a food item.

The item Information Repository 155 also stores digital information used by the Single Object Recognition Service to help identify an item from its digital image representation (the pixel data).

Once complete, the Matching Item List 165 is transmitted back to the mobile device 105 and used to generate the augmented reality image overlay information 135. XML (eXtensible Markup Language) and JSON (JavaScript Object Notation) are two well known data formats which could be used to represent the transmitted Matching Item List 165.

Finally the overlay information is displayed over the camera image 120 in the camera display screen 115.

Figure 2:
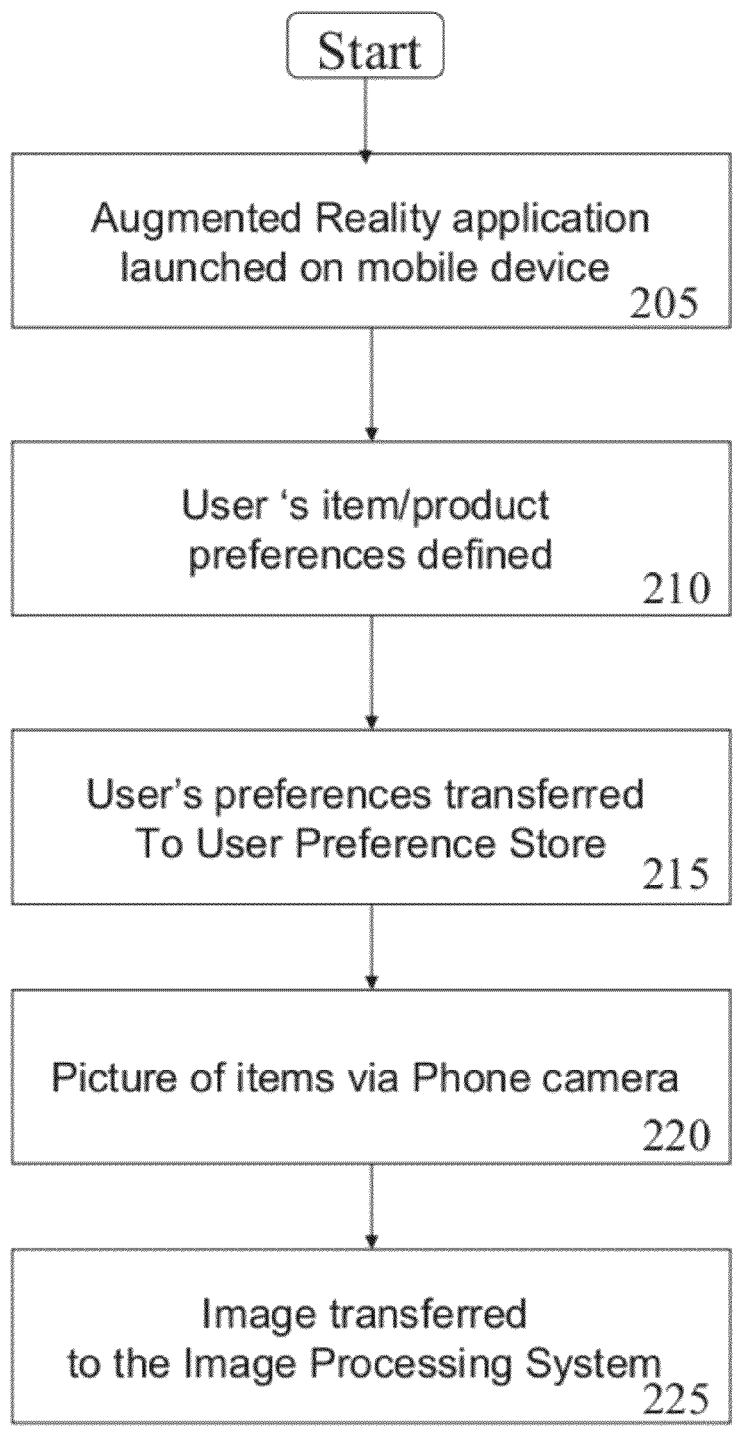
FIG. 2 is a flow chart illustrating a method for initializing a request to receive products of interest in accordance with an embodiment of the present invention.

FIG. 2 is a flow chart illustrating a method for initializing a request to receive products of interest in accordance with an embodiment.

In step 205, the user launches the augmented reality application on the mobile device. This action would typically be performed in an area providing services based on the present is invention, such as a supermarket.

In next step 210, the user interacts with the mobile augmented reality application to select and specify his/her preferences for products and items. For example, in the case of food products, these could be a preference for organic products and items with less than a certain level of fat content. Step 210 is typically performed when the application is used for the first time. Subsequently, the user may invoke this step to update the preferences at any time.

The preferences specified by the user in step 210 are posted over a network connection to the User Preference Store 190. This could take the form of a HTTP post request carrying the user preferences as key and value pairs. For example organic=Y, fat-content-level=10%, could be amongst the values transmitted to the server.

In step 220, the user has in front of him/her a large selection of products to choose from. The user points the mobile phone in the direction of the products. The augmented reality mobile application displays a live camera image on the screen. The application takes a snapshot of the live camera image defining a products view. In one scenario the products are on one or several shelves in a store. The snapshot could be taken on a regular basis, such as every second. Alternatively this could also be based on the movement of the camera so that a snapshot is only taken when there is a significant change in the camera view.

The mobile device and/or the camera may be provided to a user at the store and returned when the user has completed their shopping. The device may be connected to or be part of a shopping cart, among other things.

Next in step 225, the mobile application transfers the captured live camera image to the Image Processing System located on a server 140. This image data transmission could be implemented using HTTP or a push based messaging technology such as MQ Telemetry Transport (MQTT).

Figure 3:
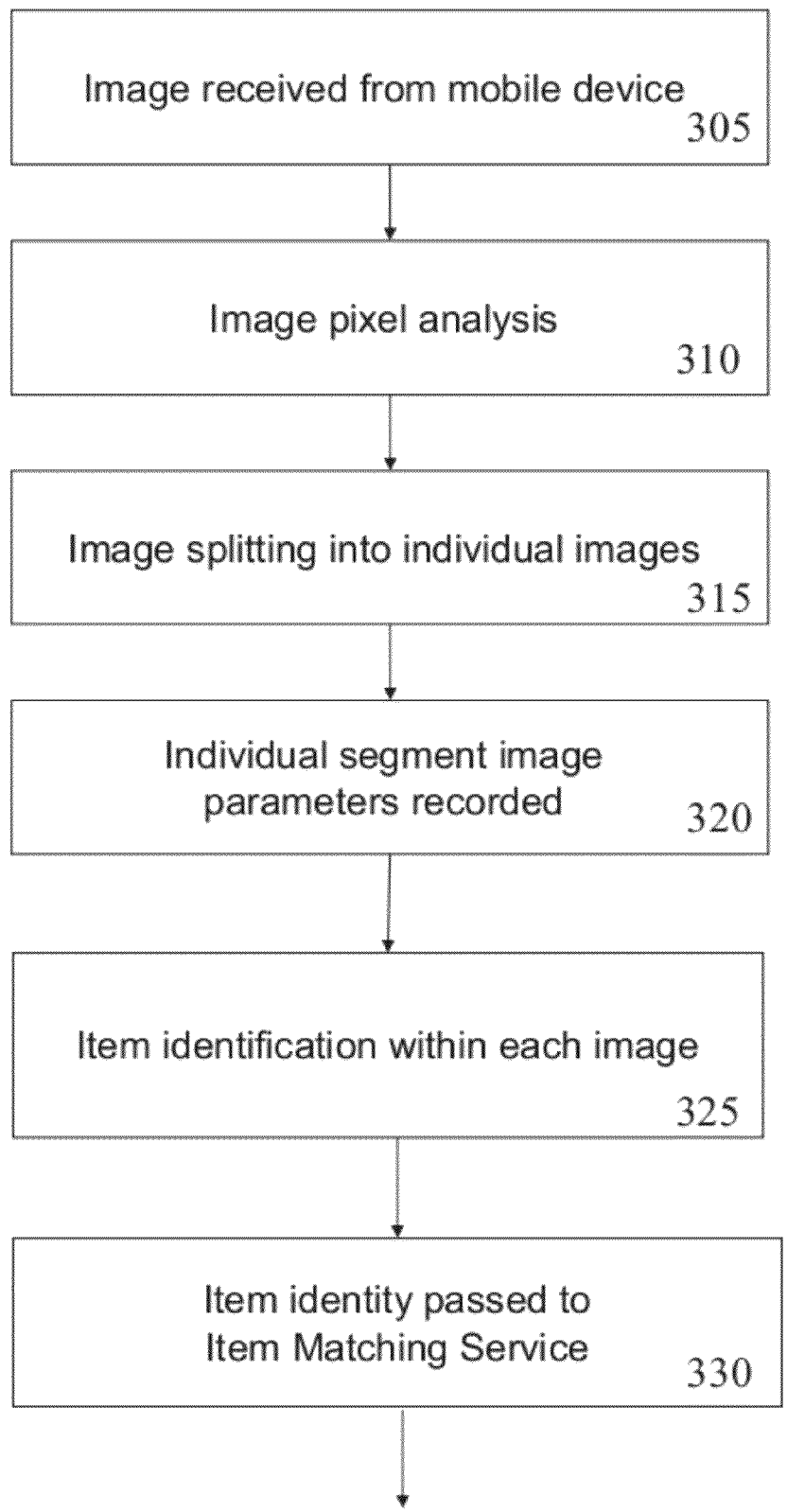
FIG. 3 is a flow chart detailing the image processing method in accordance with an embodiment of the present invention.

Referring now to FIG. 3, a flow chart detailing the image processing method in accordance with an embodiment of the present invention is described.

In step 305 the image taken by the augmented reality mobile application is received by the Image Processing Service 145.

The pixels within the image are analyzed in step 310. Each pixel in the image is compared with the pixels surrounding it to determine similarities or differences in properties such as in color as one of the compared parameters. Significant changes in these properties are used to identify the outline of products or their label in the image. The location of the outlining and edge pixels for each of the items is stored by the Image Processing Service.

The pixels that fall within a given outline, identified in step 310, represent the pixels for an individual item or product. Each one of these outlined sets of pixels is copied from the original camera image to create a new individual item segment image. This step 315 is performed for every identified area (e.g., each individual item or product) surrounded by an outline in the camera image.

The location and dimensions of each of the individual segment images within the original larger camera image is stored for future use in step 320.

Next in step 325, the Single Object Recognition Service 160 is invoked to analyze the individual item images. The function of the Single Object Recognition Service is to identify the single item within each image.

In an embodiment, this analysis uses a combination of optical character recognition (OCR) software and pixel comparison functions. The OCR step involves the recognition of any text present in the image using a now known or later developed off-the-shelf OCR software. The text recognized is then used to locate and identify the item with the Item Information Repository 155.

For the pixel comparison operation, the Item Information Repository 155 stores a pixel representation of each product or object that requires identification. The Single Object Recognition Service compares the pixels within a given image with those stored within the Item Information Repository. Closely matching pixels provide a match result between the image and a previously stored item or product.

In an alternate embodiment, the search and comparison operation could be narrowed down to a limited set of operations by using the location of the user with the mobile device as an information to reduce the number of items that require querying. This would rely on the Item Information Repository 155 having previously stored knowledge of the location of a given product within a specific area such as the supermarket the user is currently present.

Additionally, multiple images could be processed in parallel thereby optimizing the Single Object Recognition Service.

The Single Object Recognition Service returns the identity information of the identified product(s) to the Image Processing Service 145, which adds the product details to the Item Matching list 165.

Finally, the Image Processing service passes the identity information of each identified item to the Item Matching Service in step 330.

Figure 4:
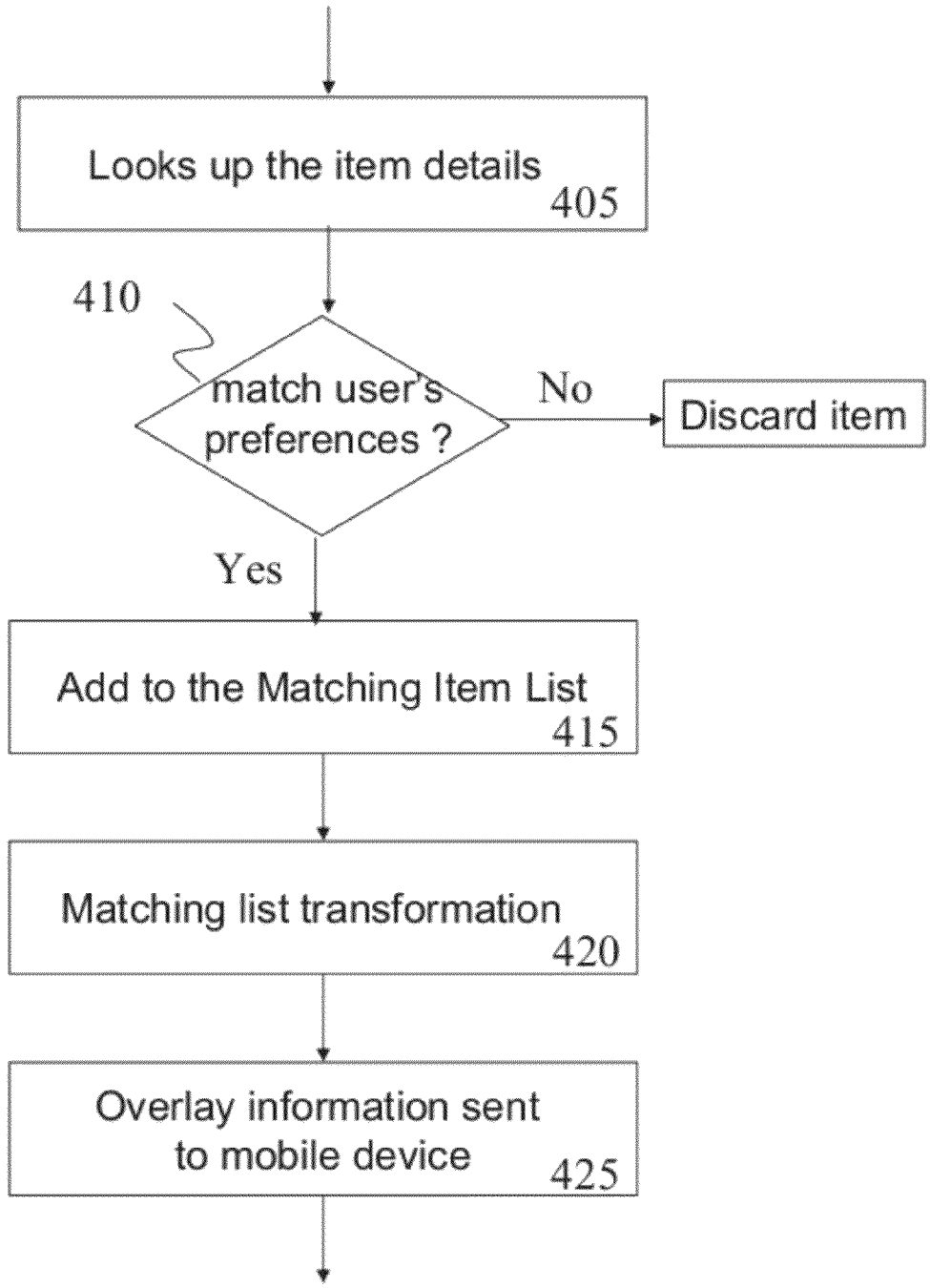
FIG. 4 is a flow chart illustrating a method for determining a user preferences in accordance with an embodiment of the present invention.

FIG. 4 is a flow chart illustrating the steps for determining a user's preference in accordance with an embodiment of the present invention.

The Item Matching Service 150 looks up the user preferences held within the User Preference Store 190 at step 405. The Item Matching Service looks up the properties and details of each matching item within the Item Information Repository.

The user's preferences are compared in step 410 against the item properties to identify the items which match the user's preferences. For example a user might have specified a preference for organic food. This preference is compared against the properties of the identified items, wherein each food item would have an organic status property.

Items whose properties match the user preferences are added to the Matching Items List in step 415. Items not matching the user preferences are discarded in an embodiment of the invention. The person skilled in the art would appreciate that alternate processing of the un-matching items could be applied.

Next in step 420 the Image Processing Service 145 links the items in the Matching Items List with the corresponding individual segment image previously stored at step 320. The location (x,y) and the dimensions of the matching segment images are used to create the overlay information for display on the mobile device. The overlay information may be defined in XML language such as the following fragment for each matching item:

```
<item>
    <location x=200 y=300/>
    <dimension length=70 height=60>
    <name>A matching product</name>
    <desc>Product description</desc>
    <reason>This product is recommended because ...</reason>
</item>
```

This overlay information is then transmitted over the network to the mobile device at step 425.

In alternate embodiment of the present invention, the overlay information transmitted to the user may be enriched with information on products which are regularly consumed by the user and which are about to run out at the user personal store at home or in other storage environments. To achieve this, information about every product purchased by a consumer is stored in an on-line secure shopping history system which also may store the date the consumer purchased the products. On-line purchases may also be registered. In a store, purchases are registered by having the consumer scanning the receipts or the products bar code or through the integration at a point-of-sale. During the user's preference matching process, the user's shopping history is searched to estimate the quantity of a particular matching product purchased in the past. Based on previous purchases an estimate of the next purchase date is used to provide back with the augmented reality information an indication of when the user might run out of that product.

In another embodiment, the overlay information may be enriched with information on products and items which are recommended or consumed or rated highly by friends or contacts of the consumer's social network. The name of the contact(s) recommending the product may also be displayed.

Figure 5:
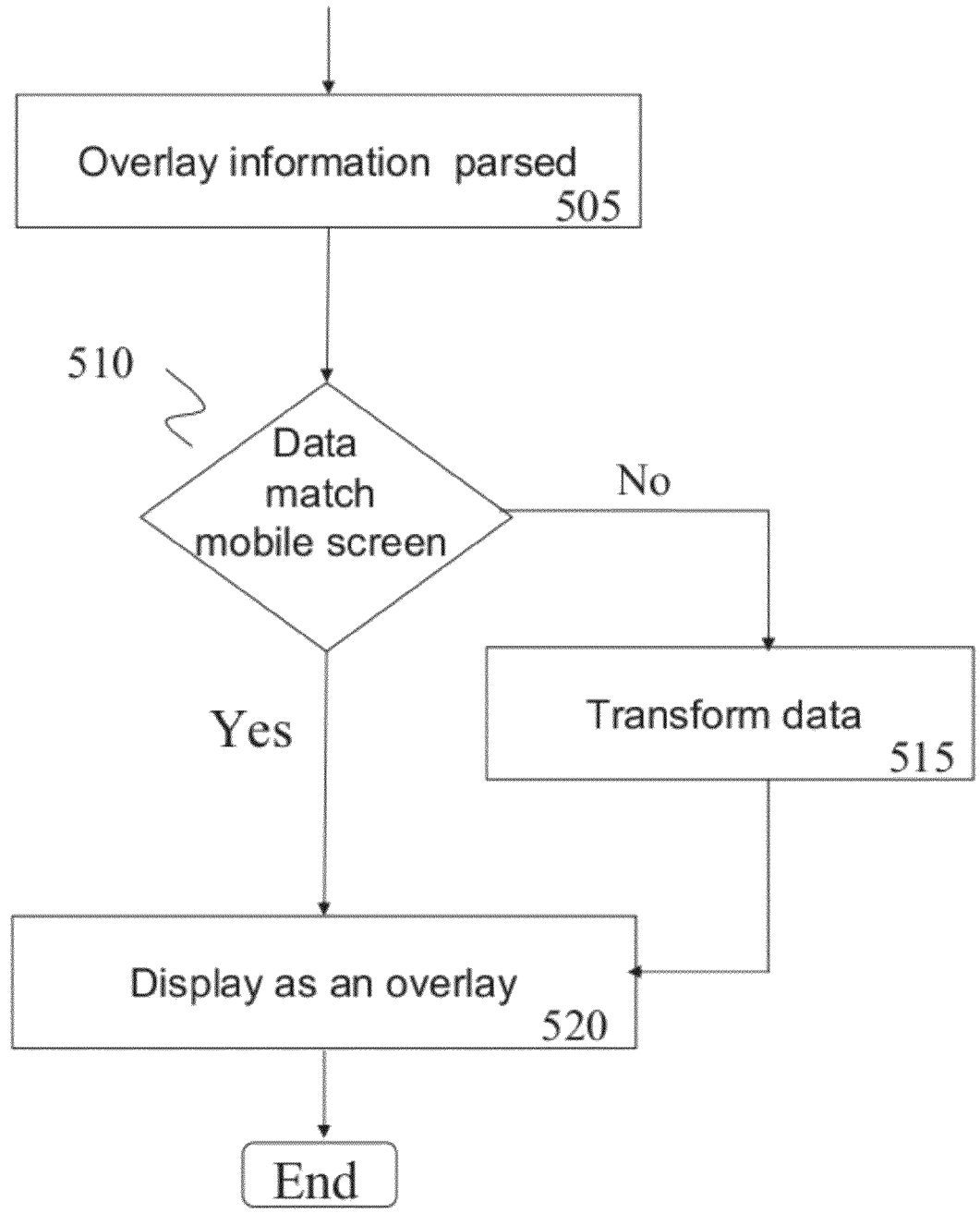
FIG. 5 is a flow chart detailing the products of interest display method in accordance with an embodiment of the present invention.

FIG. 5 is a flow chart detailing the steps of displaying the products of interest for a user in accordance with an embodiment of the present invention.

The overlay information received from the server at step 425 is parsed by the mobile device in step 505. The augmented reality mobile application 125 uses an API to render and overlay this information on top of the camera screen.

Next step 510 checks if there is a difference between the mobile device screen and the camera image resolution.

In the case of no difference in resolution (branch Yes), the overlay information is used to generate and display screen overlays figures at the given location points on the screen for each item of the received overlay information.

In a simplest implementation, the overlay figure is in the form of a rectangle having a size matching the dimension of the item in the overlay information. In various implementations, more sophisticated polygon shapes could also be use to create a detailed outline overlay around the selected item on the screen.

Additionally, accompanying text may be displayed with each overlay in step 520.

Going back to step 510, in case there is a difference in the screen and image resolution, the overlay information is adjusted up or down in step 515 to match the screen size before the information is overlaid on the screen image in step 520. The person skilled in the art would appreciate that various known techniques may be used to operate the image transformation of step 515.

The present invention may be embodied as a method, system or computer program product. Accordingly, the present invention can take the form of an entirely hardware embodiment, an entirely software embodiment (including firmware, resident software, micro-code, etc.) or an embodiment containing both hardware and software elements.

Furthermore, the invention can take the form of a computer program product accessible from a computer-usable or computer-readable medium providing program code for use by, or in connection with a computer or any instruction execution system. For the purposes of this description, a computer-usable or computer-readable medium can be any tangible apparatus that can contain, store, communicate, propagate, or transport the program for use by, or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, or a magnetic storage device. Transmission media can include an electrical connection having one or more wires, an optical fiber, an optical storage device, and a defined segment of the electromagnet spectrum through which digitally encoded content is wirelessly conveyed using a carrier wave.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It has to be appreciated that while the invention has been particularly shown and described with reference to a preferred embodiment, various changes in form and detail may be made therein without departing from the spirit, and scope of the invention.

The invention claimed is:

1. A method for providing augmented reality information on a network-enabled computing device associated with a user identifier of a user, the method comprising:
   storing purchase information regarding items previously purchased by the user;
   estimating a next required purchase date for each of the items previously purchased by the user based on the stored purchase information;
   obtaining recommendation information for at least one item recommended to the user by at least one other user via a social network;
   capturing an image of a plurality of items with an image capturing component coupled to the network-enabled computing device;
   processing the image to identify each item of the plurality of items;
   retrieving a predefined list of user preferences for the user using the user identifier;
   for each identified item, checking if the item matches a condition related to the predefined list of user preferences;
   for each item matching a condition related to the predefined list of user preferences;
      conveying item information for the matching item to the network-enabled computing device;
      overlaying the item information for the matching item on the image, the overlaying further comprising:
         overlaying enriched information on the image for the matching item if the matching item is regularly consumed by the user based on the stored purchase information; and
         overlaying enriched information on the image indicating to the user that the user be running out of the matching item based on the estimated next purchase date of the matching item; and
   overlaying recommendation information on at least one identified item in the image that has been recommended to the user.

2. The method of claim 1, wherein the network-enabled computing device comprises a mobile device having an integrated camera, and wherein the user identifier is associated with an identifier of the user's mobile device.

3. The method of claim 1, further comprising:
   sending in a wireless mode the captured image to an image processing system.

4. The method of claim 1, wherein the processing further comprises:
   performing a pixel analysis to define a set of pixel outlines; and
   creating a respective set of image segments based on the set of pixel outlines.

5. The method of claim 4, further comprising:
   identifying an item within each image segment of the set of image segments.

6. The method of claim 5, further comprising:
   storing location and dimension information of each identified item.

7. The method of claim 1, wherein the checking further comprises:
   comparing one or more properties of each identified item with the list of user preferences.

8. The method of claim 1, wherein the list of user preference is stored in a user preference store server remote from the image capturing component.

9. A system for providing augmented reality information on a network-enabled computing device associated with a user identifier of a user, the system comprising:
   a system for storing purchase information regarding items previously purchased by the user;
   a system for estimating a next required purchase date for each of the items previously purchased by the user based on the stored purchase information;
   a system for obtaining recommendation information for at least one item recommended to the user by at least one other user via a social network;
   a system for capturing an image of a plurality of items with an image capturing component coupled to the network-enabled computing device;
   a system for processing the image to identify each item of the plurality of items;
   a system for retrieving a predefined list of user preferences for the user using the user identifier;
   a system for checking, for each identified item, if the item matches a condition related to the predefined list of user preferences;
   a system for conveying, for each item matching a condition related to the predefined list of user preferences, item information for the matching item to the network-enabled computing device;
   a system for overlaying, for each item matching a condition related to the predefined list of user preferences, the item information for the matching item on the image, the overlaying further comprising:
      overlaying enriched information on the image for the matching item if the matching item is regularly consumed by the user based on the stored purchase information; and
      overlaying enriched information on the image indicating to the user that the user be running out of the matching item based on the estimated next purchase date of the matching item; and
   a system for overlaying recommendation information on at least one identified item in the image that has been recommended to the user.

10. The system of claim 9, wherein the network-enabled computing device comprises a mobile device having an integrated camera, and wherein the user identifier is associated with an identifier of the user's mobile device.

11. The system of claim 9, further comprising:
   a system for sending in a wireless mode the captured image to an image processing system.

12. The system of claim 9, wherein the system for processing further comprises:
   a system for performing a pixel analysis to define a set of pixel outlines; and
   a system for creating a respective set of image segments based on the set of pixel outlines.

13. The system of claim 12, further comprising:
   a system for identifying an item within each image segment of the set of image segments.

14. The system of claim 13, further comprising:
   a system for storing location and dimension information of each identified item.

15. The system of claim 9, wherein the system for checking further comprises:
   a system for comparing one or more properties of each identified item with the list of user preferences.

16. The system of claim 9, wherein the list of user preference is stored in a user preference store server remote from the image capturing component.

17. A non-transitory computer readable medium having a computer program product stored thereon, which when executed by a computing device, performs a method for providing augmented reality information on a network-enabled computing device associated with a user identifier of a user, the method comprising:
   storing purchase information regarding items previously purchased by the user;
   estimating a next required purchase date for each of the items previously purchased by the user based on the stored purchase information;
   obtaining recommendation information for at least one item recommended to the user by at least one other user via a social network;
   capturing an image of a plurality of items with an image capturing component coupled to the network-enabled computing device;
   processing the image to identify each item of the plurality of items;
   retrieving a predefined list of user preferences for the user using the user identifier;
   for each identified item, checking if the item matches a condition related to the predefined list of user preferences;
   for each item matching a condition related to the predefined list of user preferences;
      conveying item information for the matching item to the network-enabled computing device;
      overlaying the item information for the matching item on the image, the overlaying further comprising:
         overlaying enriched information on the image for the matching item if the matching item is regularly consumed by the user based on the stored purchase information; and
         overlaying enriched information on the image indicating to the user that the user be running out of the matching item based on the estimated next purchase date of the matching item; and
   overlaying recommendation information on at least one identified item in the image that has been recommended to the user.

* * * * *